United States Patent [19]

Hebrank

[11] Patent Number: 4,903,635
[45] Date of Patent: * Feb. 27, 1990

[54] HIGH SPEED AUTOMATED INJECTION SYSTEM FOR AVIAN EMBRYOS

[75] Inventor: John H. Hebrank, Durham, N.C.

[73] Assignee: Embrex, Inc., Raleigh, N.C.

[ * ] Notice: The portion of the term of this patent subsequent to Jul. 21, 2004 has been disclaimed.

[21] Appl. No.: 63,319

[22] Filed: Jun. 18, 1987

Related U.S. Application Data

[63] Continuation-in-part of Ser. No. 881,121, Jul. 2, 1986, Pat. No. 4,681,063.

[51] Int. Cl.4 .............................................. B65G 59/04
[52] U.S. Cl. ......................................... 119/1; 294/65; 435/284; 435/292
[58] Field of Search .................... 119/1; 604/152, 156, 604/198; 294/65; 435/284, 292

[56] References Cited

U.S. PATENT DOCUMENTS 4,681,063  7/1987  Hebrank .................................. 119/1

Primary Examiner—David A. Scherbel
Assistant Examiner—Creighton Smith
Attorney, Agent, or Firm—Bell, Seltzer, Park & Gibson

[57] ABSTRACT

The invention comprises a high speed automated injection system for avian embryos which can inject eggs with fluid substances. The device includes suction devices which lift eggs out of engagement with surfaces, rather than pushing them, before injecting them. By providing separate mechanisms and devices for first forming an opening in the egg shell and then injecting the avian enbryo or the surrounding environment with a fluid substance, the device avoids the undesirable mechanical compromise of using a single needle or punch to both puncture the shell of an egg and deliver fluid substances to the interior of the egg.

11 Claims, 2 Drawing Sheets

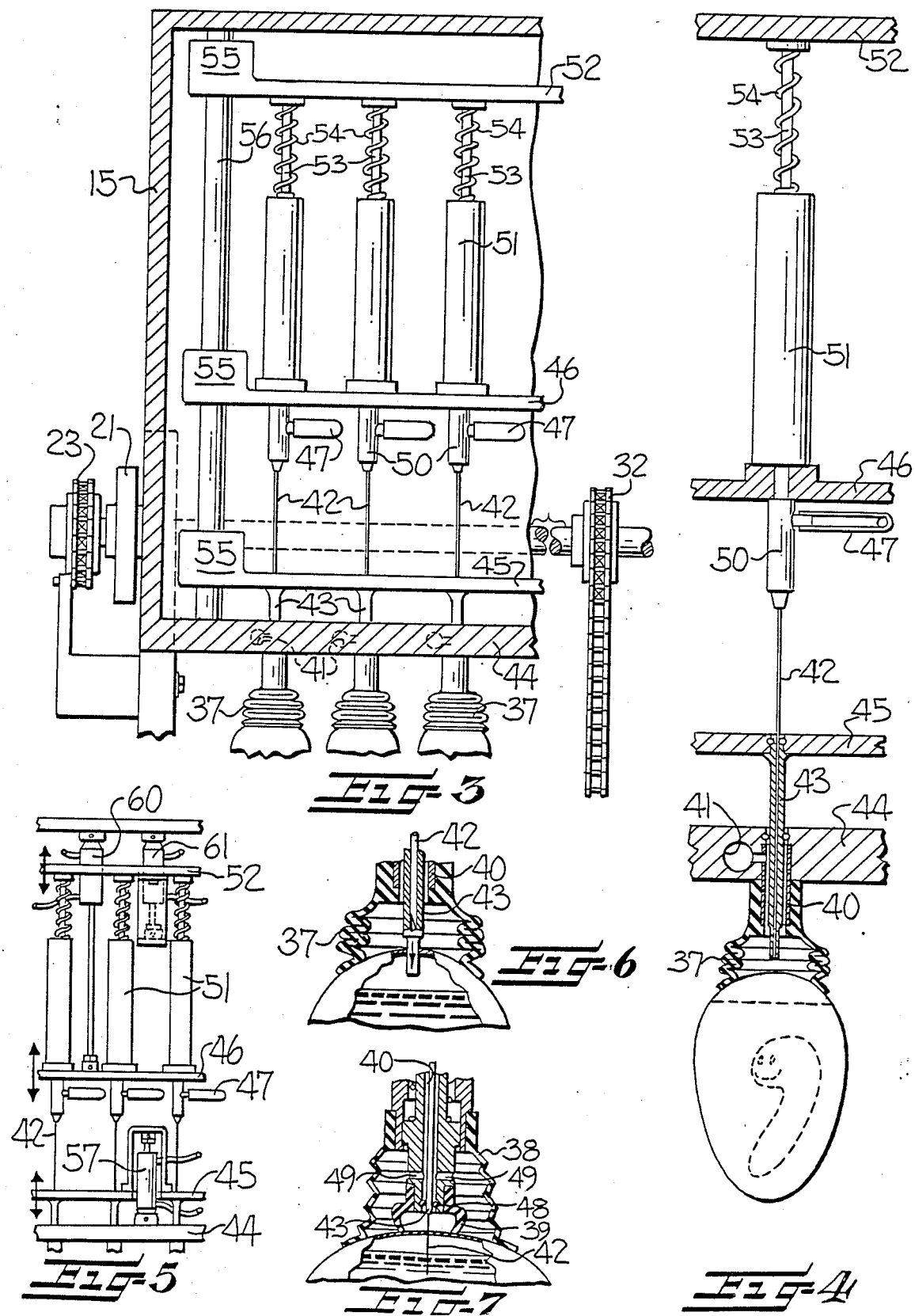

HIGH SPEED AUTOMATED INJECTION SYSTEM FOR AVIAN EMBRYOS

FIELD OF THE INVENTION

The present invention is a Continuation-in-Part of copending application Ser. No. 881,121, filed July 2, 1986 now U.S. Pat. No. 4,681,063 for "High Speed Automated Injection System For Avian Embryos" and relates to the automatic injection of eggs with fluid substances.

BACKGROUND OF THE INVENTION

A number of reasons now exist in the fields of both medicine and poultry husbandry, among others, which call for the injection of various types of avian eggs with various substances for particular reasons. In the field of medicine, eggs have typically been used to incubate certain vaccines which have medical applications.

More recently, as the field of poultry embryology has become more advanced, it has been discovered that the addition of various substances to the embryo or to the environment around the embryo within an avian egg can have beneficial effects on the growth of the subsequently hatched chick, the prevention of disease in hatched chicks, the percentage hatch of large numbers of incubated eggs, and the physical characteristics of hatched poultry. Additionally, more recent studies indicate that certain types of vaccination which could heretofore only be carried out upon either recently hatched or fully mature poultry, can now be successfully accomplished while the chick is still embryonated.

Depending upon the purpose for which the egg is being treated, the location of injection will vary. For certain purposes, the substance to be injected into the egg needs to be delivered to the amniotic fluid near the small end of the egg, for other purposes the material needs to be delivered to the air sac end of the egg, and there may even arise occasions when a substance should be delivered to the embryo itself. Nevertheless, where eggs are being incubated to produce live poultry, care must be taken to avoid injuring the embryos during the injection and delivery of fluid substances. Individual eggs, however, can vary widely in size with accompanying associated differences in the distance between the shell and the location to which delivery of a fluid substance is desired. These differences can complicate the task of consistently supplying a desired substance to a particular location within each of a large number of eggs at a fast rate of speed.

One traditional method of injecting eggs is injection by hand. Although skilled operators can inject eggs by hand with some success, the speed and accuracy of the process is limited. Additionally, hand injection of eggs, even by skilled operators, cannot always guarantee the continuous repeated precision delivery of materials to a desired particular location within each egg. Presently, there exist no widely used or practical techniques or methodologies for high speed precision application of active substances into eggs.

Similarly, an alternative technique for treating poultry to obtain desired results has been hand injection of very young—typically day-old—chicks. As in the hand injection of eggs, speed and precision are limited. Furthermore, injection so soon after hatch places significant stress on the young chicks.

In addressing these problems, several automatic devices have been disclosed for injecting eggs. These include patents issued to Sandhage, U.S. Pat. No. 3,377,989, and to Miller, U.S. Pat. Nos. 4,040,388, 4,469,04, and 4,593,646. Sandhage discloses a hand-operated egg injection device for injecting a few eggs at the same time, but does not disclose any method or system for handling large numbers of eggs quickly and accurately. Miller '388 and '646 disclose an apparatus for injecting the smaller ends of eggs and resealing the holes produced, and Miller '047 shows a somewhat different device for injecting eggs from their large, air sac ends. The Miller patents disclose automated techniques, but apparently no actual devices based on the Miller disclosures have met with much market success, for whatever reasons.

Furthermore, none of these devices lift eggs of varying sizes by pulling them towards an injection device or fail to move them at all. Given the relatively fragile nature of eggs, pushing them from one direction while puncturing them from the opposite direction can cause an economically significant increase in breakage rates.

Finally, all of these devices disclosed in these patents puncture eggs with the same instrument with which they deliver the fluid substances. Accordingly, various types of precise needles which may not be rigid enough to puncture an egg shell cannot be used in these devices. Alternatively, if such devices are equipped with needles large enough and rigid enough to puncture the egg shell, such needles may not provide the precise delivery of fluid—both as to location and amount—which more delicate needles can provide. Furthermore, the punching process will dull the beveled edge necessary for membrane penetration.

Accordingly, it is an object of this invention to provide an automatic egg injection machine which can simultaneously inject a plurality of eggs of varying sizes and deliver injected fluid substances to the same particular location with each egg, regardless of the size of the egg.

It is a further object of this invention to provide means for lifting a plurality of eggs from their upwardly facing ends rather than pushing them from the portions which rest on a tray or other holding device.

It is another object of this invention to provide a device and a method for automatically innoculating eggs with fluid substances while concurrently transferring the eggs from one position to another, such as from an incubation setting tray to a hatching tray.

It is a further object of this invention to provide a device which positions an egg and an injection needle in a fixed relationship with respect to one another in order to provide accurate and precise injection and delivery of fluid substances to a desired location within eggs of various sizes, regardless of the various sizes of the eggs.

Finally, it is an object of this invention to provide a device in which the functions of perforating the eggs and delivering fluid substances are carried out by two different tools or mechanisms so that each can be tailored to perform the intended task in the best possible manner.

SUMMARY OF THE INVENTION

The present invention addresses these objects by providing an innoculating device in which suction means simultaneously engage and lift a plurality of individual eggs from their respective upwardly facing portions and injects the eggs with the fluid substance while the eggs are engaged by the suction. At the same time, a preferred embodiment of the device automatically transfers eggs from an incubation setting tray to a hatching tray. Most importantly, the device precisely and accurately positions the delivery ends of its injection needles at consistent locations within each individual egg regardless of the size of the eggs.

The foregoing and other objects, advantages and features of the invention, and the manner in which the same are accomplished will become more readily apparent upon consideration of the following detailed description of the invention taken in conjunction with the accompanying drawings, which illustrate preferred and exemplary embodiments and wherein:

FIG. 3 is an enlarged cross-sectional view showing a portion of the injection head subassembly;

FIG. 4 is an enlarged, detailed partial cross-sectional view of one of the injectors of the present invention;

FIG. 5 is another partial sectional view of a portion of the suction and injection subassembly;

FIG. 6 is an enlarged view of the portion of the device which egg; and

FIG. 7 is an enlarged view similar to FIG. 6, but showing a second embodiment of the suction subassembly and an injection needle extended into the amniotic fluid of an egg.

DETAILED DESCRIPTION

Figure 1:
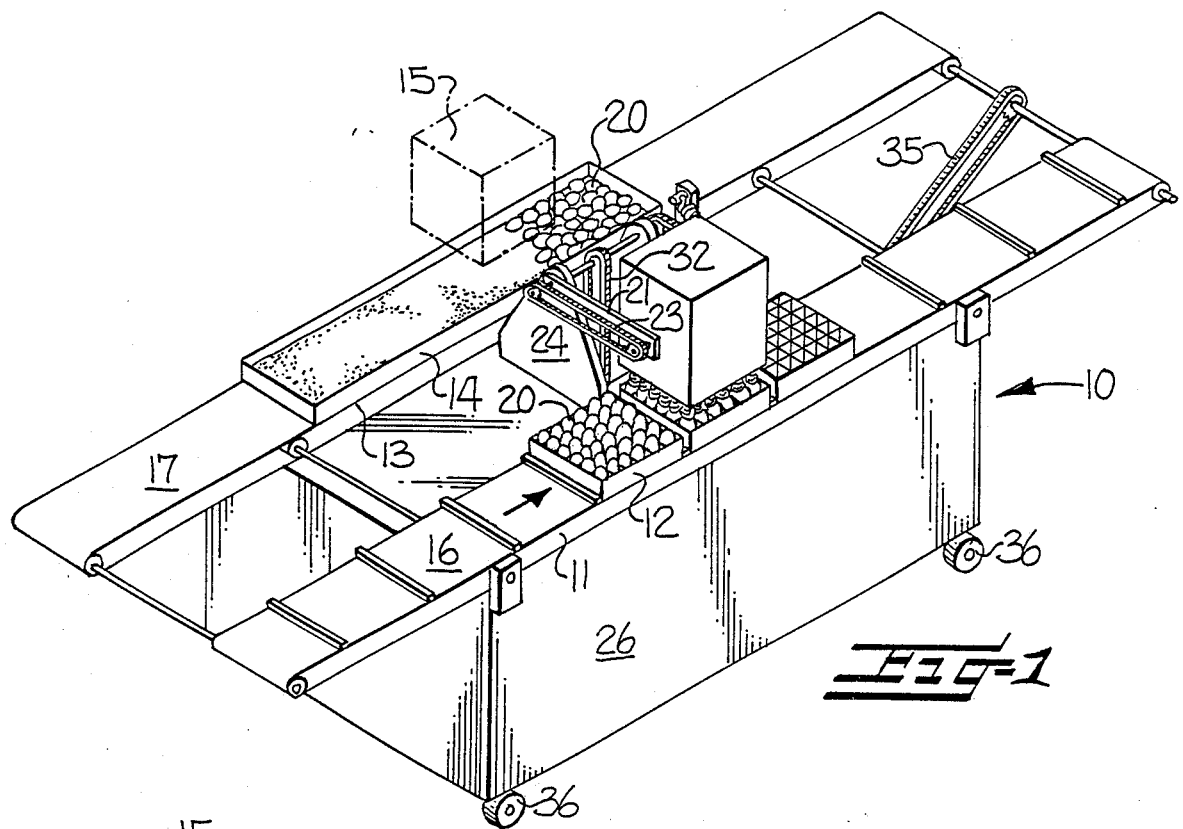
FIG. 1 is an overall perspective view of a preferred embodiment of the present invention.
Figure 2:
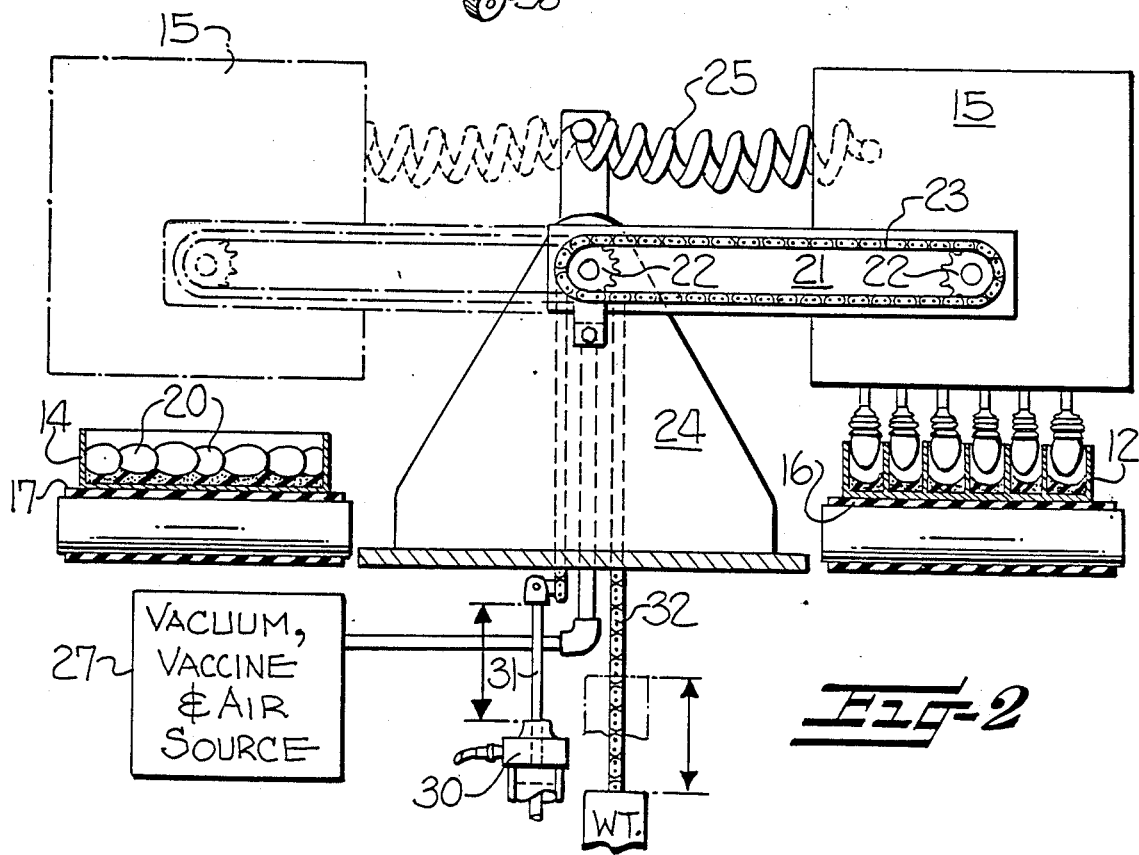
FIG. 2 is a side elevational view of the suction and injection assembly of the invention.

As illustrated in FIG. 1, a preferred embodiment of the invention is broadly designated at 10. As will be described herein, the device 10 broadly comprises suction means for simultaneously engaging and lifting a plurality of individual eggs from their respective upwardly facing portions and injection means which cooperate with the suction means to inject the eggs while they are engaged by the suction means.

As further shown by FIG. 1, the preferred embodiment of the device also transfers eggs from incubation setting trays to hatching trays while the injection of the eggs is taking place. As is known to those familiar with the incubation and hatching of eggs, incubated eggs are kept in an upright position in large trays which are slowly rocked back and forth in order to mimic the natural setting motion of a hen, which keeps the embryo floating freely in the amniotic fluid and prevents it from becoming attached to any one portion of the shell.

When eggs are ready to hatch, they must be allowed to rest in a position lying on their side, in which position the poultry chick can break the egg and emerge. Additionally, newly hatched chicks require a flat surface to walk on in order to avoid later problems with their legs. Accordingly, incubated eggs always must be transferred from setting trays which orient them in an upright position to hatching trays where they may rest freely in a generally horizontal orientation on a flat surface. As will be described more fully hereinafter, the present invention accomplishes this transfer automatically and in combination with injection. It will be understood by those familiar with this art that the transfer of eggs from setting trays to hatching trays during the injection process is not a necessary feature or limitation of the present invention, but is an advantageous feature that can be incorporated in the invention.

As seen broadly in FIG. 1, the illustrated embodiment of the device 10 includes a first rack 11 for receiving an incubation setting tray 12 containing eggs and a second rack 13 spaced apart from the first rack for receiving a hatching tray 14 thereon. In the embodiment illustrated, the suction and injection assembly is carried in a housing and broadly designated at 15. The housing and the assembly it carries is positioned between the first and second rack and mounted for movement between them. In the manner described earlier, the suction and injection assembly can simultaneously engage the upwardly facing portions of a plurality of individual eggs 20 at the first rack 11 and then hold the eggs by suction while carrying eggs to the second rack 13. As illustrated, the suction and injection assembly 15 can carry thirty-six eggs. The egg injection means described earlier inject the eggs with fluid substances while they are engaged and held by the suction so that incubated eggs in the setting tray 12 can be automatically removed from the setting tray, injected with a fluid substance, and then placed in the hatching tray 14, all without manual operation.

As used herein, the term "fluid" refers to any material which will flow, and is not limited to pure liquids. The term "fluid" can also refer to solutions, liquid-liquid suspensions, liquid-solid suspensions, gases, gaseous suspensions, emulsions, certain solid materials, and any other material or mixture of materials which exhibits fluid properties.

In the embodiment shown, the eggs 20 can be transferred from the setting tray 12 to a hatching tray 14 which carries a larger amount of eggs, typically 144. A conveyor belt 16 runs across the first rack 11, moves the setting trays under the suction and injection assembly 15, and stops them there while the eggs are being engaged. A similar conveyor belt 17 runs across the second rack 13 and moves the hatching trays under the assembly 15 and stops them there while the eggs are being released. In order to provide the necessary movement of the suction and injection assembly 15 between the first and second racks, there are provided injection assembly support arms 21, leveling sprockets 22, chain 23, a support plate 24, and an umbilical cord 25. The cord 25 can include the supply route for the fluid substance to be injected and the control means for the injection needles, and can also supply the vacuum suction to the flexible cups.

The base cabinet 26 can include the source of fluid substances, air and vacuum, shown schematically at 27, and a hydraulic cylinder 30 for moving the suction and injection assembly 15 by means of the arms 21 and the sprocket and chain 22 and 23, respectively. These are operatively connected to the cylinder 30 by the reciprocal arms 31, the weighted chain 32, sprocket 33, the shaft 34, and rack drive 35. In the device illustrated, portions of the racks 11 and 13 are foldable, and the entire device is mounted on wheels 36, making it portable.

As best shown in the singular view of FIG. 4, the suction means comprise a plurality of flexible cups 37, each of which is adapted for being received in seated, sealing relation against portions of the shell of an egg 20. A tube 40 is in communication with each of the flexible cups 37, preferably at upper portions thereof. Means are provided in communication with each of the tubes 40 for providing suction through the tube 40 to the cup 37, so that the suction seats the shell of an egg against the cup. In the illustrated embodiment, a vacuum channel 41 in communication with a suction source provides the suction to the tube 40.

The suction cups 37 also compress to a solid height so that when suction is applied from the vacuum channel 41 and through the tube 40 to the flexible cup 37, the cup engages the egg, and compresses to its solid height, and thereby fixes the position of the top of the egg with respect to the cup 37 and base plate 44.

An alternative form of flexible cup 38 is illustrated in FIG. 7, along with a narrower needle 42 and punch 43. This cup 38 includes an inner cup 39 concentric with the outer cup 38. Outer cup 38 is in communication with the suction tube 40 through horizontal passages 49. A seal such as O-ring 48 isolates inner cup 39, injection needle 42, and punch 43 from the suction means. This structure allows the egg to be engaged by suction applied over the area between cups 38 and 39 while preventing any potential suction interference with the injection means over the area defined inside of cup 39.

As set forth earlier herein, because the injection device 10 lifts the eggs from their top portion, rather than pushing them from the bottom portions, the device 10 can lift eggs out of one type of tray and replace them in a second type of tray. Such action is impossible when using the previous devices because each of these devices either could not move eggs at all or always pushed the eggs from the bottom, usually by lifting the trays in which they were already positioned. Accordingly, because it lifts rather than pushes, the present invention can transfer eggs from place to place in addition to injecting them.

The injection operation of the invention is best illustrated in FIGS. 4, 6 and 7, which show a detailed view of the injection means. These include a plurality of needles 42 which have delivery ends 42a for supplying fluid substances therefrom. Adjacent each of the needles 42 are the punches 43 each of which forms an opening in the upwardly facing shell portions of each respective egg 20 while the device 10 holds the egg by suction. As seen in the drawings, each of the punches 43 surrounds one of the needles 42 so that after the punch 43 makes an opening in the shell of an egg, each respective injection needle can move through the respective punch and respective opening of an egg shell to an injecting position. In this manner, the punch 43 can be selected to best form the required opening in the shell while the needle 42 can be selected to maximize the accuracy and precision of fluid delivery.

Furthermore, a sharp needle—typically bevelled—is a prerequisite for penetrating the egg's membrane. Therefore, the invention's provision of a separate punch and its consequent prevention of the needle's engagement with the egg shell preserves both the sharpness of the needle and its overall structural integrity and results in longer use of, and more consistent results from, each needle. Additionally, a smaller and more delicate needle can meter and deliver small amounts of fluid in a more precise manner.

As further shown in FIG. 4, the injection needles 42 have their delivery ends 42a respectively disposed within each tube 40. The needles 42 are movable between a retracted inoperative position (FIG. 6) and an extended injecting position (FIG. 7) with respect to the tube 40, and therefore with respect to the cup 37 or 38 and the egg 20. As a result, the relationship defined by the seated position of the shell of an egg 20 against the cup 37 or 38 and the injecting position of the needle 42 reproducibly positions the needle at a predetermined location within the egg 20, regardless of its size.

As shown in some detail in FIGS. 3 and 4, in the illustrated embodiment the injection assembly is driven by a plurality of movable plates. A base plate 44 carries the suction channel 41, the tubes 40 and the cups 37. A punch drive plate 45 carries the punches 43 and moves them into perforating engagement with the eggs 20. The needles 42 are in turn driven by an injection drive plate 46.

In the embodiment shown, the substance which is to be injected into the egg 20 enters the system through the substance tube 47 and then moves into the valve portion 50 of a fluid pump 51. As illustrated in FIGS. 3 and 4, the fluid pump 51 is a syringe-type pump operated by the pump drive plate 52 which drives the syringe plunger 53. The pump 51 includes a plunger return spring 54 which recycles the plunger after the drive plate 52 returns.

The somewhat larger view of FIG. 3 shows all of these elements as well as the linear bearings 55 which support each of the respective drive plates during their respective up and down movement on support shafts 56, one of which is shown. FIG. 5 shows air cylinders 57, 60 and 61 which drive the punch drive plate 45, the injection drive plate 46 and the pump drive plate 52, respectively.

It will be understood, however, that the relative movement of the eggs and injection needles is not limited to being carried out by the particular assembly illustrated and described herein. Any assembly which provides appropriate relative movement between the engaged eggs and the needles and punches will be satisfactory. For example, there may exist circumstances under which the engaged eggs are moved a predetermined distance towards needles which remain stationary until the eggs and needles are at a relative injection position with respect to one another and at which the delivery ends of the needles extend through the openings formed in the eggs to position the delivery ends of the needles at a consistent location within each egg regardless of the size of the egg.

As will be understood by those familiar with the handling of eggs, the invention is compatible with a number of other procedures which are part of incubation and hatching of live poultry. For example, eggs may be examined prior to inoculation in order to detect infertile or broken ones. Possible techniques include light ("candling"), sound, or other diagnostic tools. The nature of the present invention provides for the incorporation of such techniques, especially given the conveying, lifting and transferring functions of the invention.

Because of all of these features, the invention also includes a method of simultaneously injecting a plurality of eggs of varying sizes with fluid substances, which method comprises applying suction to the upwardly facing shell portions of a plurality of individual eggs to engage and hold the eggs, lifting the eggs while the eggs are held by the suction and injecting the eggs with a fluid substance while the eggs are hend by the suction. In particular embodiments, the method comprises lifting the eggs out of their respective trays before injecting them, although it will be understood that the invention is not limited to injection which takes place while the eggs are lifted. The method further comprises transferring the lifted and injected eggs from a setting tray to a hatching tray using suction to engage and hold the eggs while they are being lifted and transferred.

In another aspect, the invention includes a method of forming an opening in the shell of an egg with a tubular punch, moving an injection needle through the tubular punch and then through the opening formed in the shell of the egg and then injecting a fluid substance through the needle and into the egg.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A device for injecting an egg with a fluid substance and comprising:
   a tubular punch for forming an opening in the shell of an egg;
   an injection needle positioned within said tubular punch for movement therethrough and through an opening in an egg shell formed by said tubular punch; and
   means for delivering a fluid through said injection needle.

2. A device for simultaneously injecting a plurality of eggs of varying sizes with fluid substances, said device comprising:
   suction means for simultaneously engaging and lifting a plurality of individual eggs from their respective upwardly facing portions;
   a plurality of injection needles having delivery ends for supplying fluid substances therefrom;
   means adjacent each of said needles for forming an opening in an upwardly facing portion of the egg while the upwardly facing portion is engaged by said suction means; and
   means for moving engaged eggs a predetermined distance towards said needles from an engaged position to an injection position at which said delivery ends of said needles extend through the openings in the eggs in a delivery position at which said delivery ends of said needles are at a consistent location within each individual egg regardless of the size of the eggs.

3. A device according to claim 2 wherein each of said opening-forming means comprises a generally cylindrical, tubular punch with one of said needles disposed within said punch.

4. A device according to claim 2 wherein said needles have side port delivery openings.

5. A device according to claim 2 wherein said suction means includes:
   a plurality of flexible cups each of which is adapted for being received in seated sealing relation against portions of the shell of an egg;
   a tube in communication with each of said flexible cups; and
   means in communication with each of said tubes for providing suction through said tube and to said cup, so that the suction seats the shell of an egg against said cup.

6. A device according to claim 5 wherein each of said flexible cups comprises respective inner and outer concentric cups with said outer cup being in communication with said tubes and with said suction means, and said inner cup being positioned to isolate said injection means from said suction means, to thereby allow an egg to be engaged by suction while preventing the suction from interfering with the injection means and its operation.

7. A device according to claim 5 wherein the delivery end of each of said injection needles is disposed within one of said tubes, and movable between a retracted inoperative position and an extended injecting position with respect to said tube, whereby the relationship defined by the seated position of the shell of an egg against said cup and the injecting position of said needle reproducibly positions the needle at a predetermined location within an egg, regardless of the size of the egg.

8. A device for simultaneously injecting a plurality of eggs of varying sizes with fluid substances so that the substances are placed at a consistent location within each egg regardless of the size of each egg, said device comprising:
   a plurality of flexible cups adapted for being received in seated sealing relation against upwardly facing shell portions of an egg;
   a plurality of tubes, each of which is in communication with upper portions of one of said flexible cups;
   means in communication with each of said tubes for providing suction through each tube and to each cup, so that the suction seats the upwardly facing shell portions of an egg against each of said cups and lifts each of the eggs until the respective top portions of the upwardly facing shell portions of the eggs are at one defined horizontal position with respect to one another, regardless of the size of the individual eggs;
   a plurality of injection needles having delivery ends for supplying fluid substances therefrom, and with the delivery end of each of said needles being disposed within one of said tubes;
   means for providing relative movement between said flexible cups and said injection needles and for defining a respective inoperative position between said needles and engaged eggs and a respective injecting position at which each of said delivery ends of said needles is at a consistent location within each individual egg; and
   a plurality of punches, each of which is positioned within one of said tubes and surrounds one of said needles, for puncturing the upwardly facing shell portions of an egg positioned by said suction means, so that the relative movement of said needles and said cups positions said injection needles through the respective punctured portion of an egg at an extended injecting position and so that the relationship defined by the seated position of the shells of the eggs against said cups and by the injecting position of said needles permits delivery of fluid substances to a defined desired position within each individual egg, regardless of the size of the egg.

9. A method of positioning an egg and an injection needle in a fixed relationship with respect to one another in order to provide accurate and precise injection and delivery of fluid substances to a desired location within eggs of various sizes, said method comprising:
   placing a flexible cup in seating sealing relation against portions of the shell of an egg;
   providing suction to the cup to seat the shell of an egg against the cup; and
   moving the flexible cup towards an injecting position defined by an injection needle so that the relationship defined by the seated position of the cup against the egg and the injecting position of the cup reproducibly positions the needle at a predetermined location within the egg, regardless of the size of the egg.

10. A method according to claim 9 further comprising perforating the shell of the egg before moving the cup to the injecting position.

11. A method for injecting an egg with a fluid substance and comprising:
    forming an opening in the shell of an egg with a tubular punch;
    moving an injection needle through the tubular punch and then through the opening formed in the shell of the egg; and
    injecting a fluid substance through the needle and into the egg.

* * * * *

UNITED STATES PATENT AND TRADEMARK OFFICE
CERTIFICATE OF CORRECTION

PATENT NO. : 4,903,635
DATED : February 27, 1990
INVENTOR(S) : Hebrank

It is certified that error appears in the above-identified patent and that said Letters Patent is hereby corrected as shown below:

Column 2, Line 3, delete "4,469,04" and insert--4,469,047--.

Column 3, Line 17, after "assembly" insert--portions--.

Column 3, Line 25, after "which" insert--punctures an--.

Signed and Sealed this

Twenty-fifth Day of June, 1991

Attest:

HARRY F. MANBECK, JR.

*Attesting Officer*     *Commissioner of Patents and Trademarks*